(12) United States Patent
Weldy

(10) Patent No.: US 6,804,407 B2
(45) Date of Patent: Oct. 12, 2004

(54) METHOD OF IMAGE PROCESSING

(75) Inventor: John A. Weldy, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 744 days.

(21) Appl. No.: 09/726,681

(22) Filed: Nov. 30, 2000

(65) Prior Publication Data

US 2001/0031083 A1 Oct. 18, 2001

(30) Foreign Application Priority Data

Apr. 2, 2000 (GB) .............................................. 0002481

(51) Int. Cl.⁷ ............................................... G06K 9/40
(52) U.S. Cl. ...................... 382/260; 382/263; 382/264; 382/272; 382/274; 382/275; 358/504; 358/505; 358/500; 358/512; 358/474
(58) Field of Search ........................ 382/167, 260–275, 382/303, 191; 358/448, 500, 518, 505, 504, 474, 512; 348/180, 182, 452, 453, 443, 389.1, 437.1; 345/611, 428, 581

(56) References Cited

U.S. PATENT DOCUMENTS 4,866,626 A * 9/1989 Egli ........................... 701/207
5,055,927 A * 10/1991 Keesen et al. ............ 348/389.1
6,119,083 A * 9/2000 Hollier et al. ............... 704/243
6,188,804 B1 2/2001 Weldy et al.
6,360,022 B1 * 3/2002 Lubin et al. ................. 382/260
6,496,221 B1 * 12/2002 Wolf et al. .................. 348/192

FOREIGN PATENT DOCUMENTS

EP 0 935 168 A2 8/1999
GB 0959 430 A1 * 11/1999 ....................... 5/20

* cited by examiner

Primary Examiner—Bhavesh M. Mehta
Assistant Examiner—Ali Bayat
(74) Attorney, Agent, or Firm—Frank Pincelli

(57) ABSTRACT

A method of image processing in which a plurality of channel input signals are a function of unknown recorded signal levels and unknown signal sensitivities, the method involving the sampling and measuring of the recorded signals and sensitivities at each channel to determine weighting values that eliminate the contribution of the unknown signal sensitivities, the weighting values being used to further process the input signals to form output signals representing the unknown recorded level signals.

8 Claims, 1 Drawing Sheet

METHOD OF IMAGE PROCESSING

FIELD OF THE INVENTION

The present invention relates to methods of image processing, and more particularly to methods for removing the degradation resulting from sampling systems where more than one channel of information is captured and both channel signal and sensitivity are unknown and vary at each sample location.

BACKGROUND OF THE INVENTION

An example of a system that captures more than one channel with unknown and varying signal and sensitivity is a color filter array (CFA) film that has been spatially sampled with a film scanner. A CFA film for capturing the red, green, and blue channel information required for human color perception contains at least three colored species from which red, green, and blue channel information can be decoded. A CFA film can be designed for direct viewing and/or optical printing. However the CFA structure degrades image quality.

A CFA film is disclosed in EP 935168. The color filter array comprises colored resin particles which are randomly arranged.

If the number of independent channels of information acquired by electro-optical scanning of a CFA film is at least twice minus one the number of desired information channels, then at each scanned pixel location, it is possible to determine both the amount of signal (silver or other light modulating species formed in a photo process as a function of light intensity) formed in spatial coincidence with the total sub-pixel area occupied with similarly colored CFA elements (the relative sensitivity). The twice minus one arises from the area constraint at each pixel; that is that the sum of the area of all of the individual sub-pixel CFA elements is equal to the effective scanning aperture or pixel area. One such system is described in U.S. patent application Ser. No. 09/080,791 wherein twice the number of desired channels of independent information is acquired in order to essentially (within the limits of bit depth) determine both the amount of silver formed under the total sub-pixel area filled with similarly colored CFA elements and the total sub-pixel area filled with similarly colored CFA elements.

However, most existing scanning systems do not possess the capability of acquiring these extra channels of independent information required to perform this joint determination. By applying the following image processing method, it is possible to determine the amount of silver formed under the total sub-pixel area filled with similarly colored CFA elements and the total sub-pixel area filled with similarly colored CFA elements from electro-optical scanning where the number of independent channels of information acquired equals the number of desired information channels.
For a three channel system the problem to be solved, at each pixel position (p, q), can be expressed as follows:

$$C_{m1}(p, q) = X_1(p, q) C_1(p, q) \quad (1a)$$

$$C_{m2}(p, q) = X_2(p, q) C_2(p, q) \quad (1b)$$

$$C_{m3}(p, q) = X_3(p, q) C_3(p, q) \quad (1c)$$

$$X_1(p, q) + X_2(p, q) + X_3(p, q) = 1.0 \quad (1d)$$

where $C_{mi}$ is the measured transmittance of the ith color channel, $X_i$ is the fraction of effective scanning pixel area covered by sub-pixel CFA elements of the ith color, and $C_i$ is the desired recorded image signal for the ith channel at each pixel position (p, q). For simplification, the (p, q) will not be included explicitly in subsequent equations, but it will be understood that all equations are a function of pixel position.

A simple assumption would be that for each channel i in a local area, the average fraction of pixel area covered, the values of $X_i$, are constant and equal to the average fraction observed over the entire scanned image and these fractions are known. Defining these known fractions as $\bar{X}_i$, and assuming that over some small area that essentially defines the window for a low pass filter, the values of $C_i$ are calculated as follows:

$$C_i = \text{lpf}(C_{mi})/\bar{X}_1 \quad (2)$$

where $\text{lpf}(C_{mi})$ is the low-pass version of the $C_{mi}$ measurement, sufficiently low-passed so that the above average fraction assumption is constant. Low-pass filtering of a sampled image is well known in the art and is achieved, for example, by applying a finite impulse response (FIR) filter to a sampled signal.

Unfortunately, in order to achieve this constancy condition, excessive low-pass filtering is required, resulting in low spatial resolution and image quality. Alternate assumptions can be employed that result in improved image quality.

Another approach well-practiced in the art of color imaging is to transform the three measured signals, e.g. red, green, and blue, to signals such as one luminance and two chrominance signals. Luminance is broadly defined as a linear combination of red, green, and blue, all with positive weightings that sum to unity. The two chrominance signals are broadly defined as independent representations of the color information with weightings that sum to zero. A set of weightings that is used in television systems is:

$$L = 0.30 C_1 + 0.59 C_2 + 0.11 C_3 \quad (3a)$$

$$B-L = -0.30 C_1 - 0.59 C_2 + 0.89 C_3 \quad (3b)$$

$$R-L = 0.70 C_1 - 0.59 C_2 - 0.11 C_3 \quad (3c)$$

where L is the luminance-like signal and B-L and R-L are the two chrominance-like signals. The weighting coefficients for L are all positive and sum to unity. The weighting coefficients for B-L and R-L sum to zero. For this example, $C_1 = R$ (red), $C_2 = G$ (green) and $C_3 = B$ (blue). Owing to the characteristics of the human visual system, it is possible to low-pass filter chrominance signals significantly more than luminance signals whilst maintaining good image quality. Applying this transformation to the unknown signal, unknown sensitivity system described by equations (1) produces an improved image, i.e. an image without high frequency colored noise. The noise owing to the color filter array is reduced in some colored areas. However, most of the image suffers from CFA noise and colored mottle (low frequency color noise). The high frequency CFA noise is manifest as non-colored noise owing to the transformation, equation (3a), and lack of low-pass filtering of the L signal. If the CFA has low frequency power, then the resulting chrominance signals will contribute colored mottle (low frequency noise) to an image reconstructed after the above described image processing. If all of the transformed signals in equations (3) were equally low-pass filtered, then the result, by the application of linear systems theory, would be equivalent to that achieved by low-pass filtering the signals represented by equation (2).

It is an aim of the invention to provide a method of image processing which avoids the problems mentioned above, which does not require a special scanner but gives good quality results with typical scanning means.

SUMMARY OF THE INVENTION

According to the present invention there is provided a method of forming output signals from a plurality of channel input signals, said input signals being a function of both unknown recorded signal levels and unknown signal sensitivities, the method comprising the steps of;

sampling and measuring the product of the recorded signals and the signal sensitivities for each sampled channel input signal;

determining at each sampled location channel weighting values which eliminate the contribution of the unknown signal sensitivities; and further processing the plurality of channel input signals using the determined channel weighting values to form output signals that represent the unknown recorded signal levels.

By applying multi channel scanning and image processing according to the invention it is possible to remove essentially all of the image quality degradation due to the CFA structure.

DETAILED DESCRIPTION OF THE INVENTION

Figure 1:
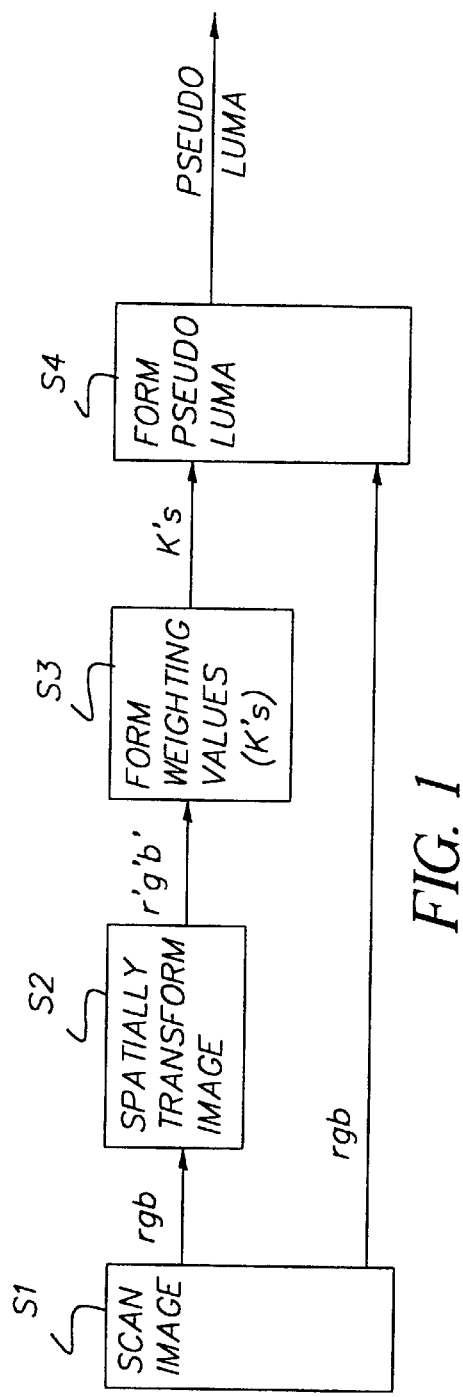
FIG. 1 is a flow diagram showing the method of forming a pseudo-luma signal.
Figure 2:
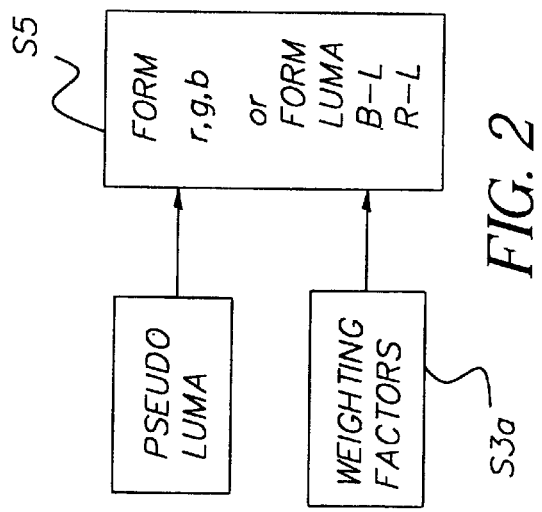
FIG. 2 is a flow diagram showing the method of forming color signals.

The method of this invention starts with a first step of producing a pseudo-luma signal, see FIG. 1, and then follows with steps to form the color signals, see FIG. 2.

In general terms, with reference to FIG. 1, the image is scanned, step S1, and samples taken of each channel. Each sample is spatially transformed, step S2. Step S2 is not an essential step and in some methods of the invention this step is omitted. Depending on the method of the invention being used a high pass or a low pass filter may be used. Weighting values are determined in step S3. It is important to note that the neighborhood used to determine the weighting values need not be the same neighborhood as that used in the spatial transformation. In method A, described in detail later, the neighborhood used for determining the weighting values covers a single pixel. In step S4 a pseudo luma equation is formed using samples taken from each channel and the weighting values determined in step S3.

A pseudo-luma signal is defined as any sum of $C_i$ (i=1 to 3) signals that satisfies the following equation:

$$\text{Pseudo-Luma} = k_1 C_1 + k_2 C_2 + k_3 C_3 \quad (4)$$

where the k values, i.e. the channel weightings, are constrained to sum to unity:

$$k_1 + k_2 + k_3 = 1.0 \quad (5)$$

If the image signal color is constant in a small neighborhood (small number of pixels) which is oftentimes the case and is also the case with the human visual system, then it can be shown that the noise owing to the CFA can be eliminated if the appropriate values of $k_i$ are chosen for each pixel location. Constant color, $CC_i$, is defined to be the fraction of $C_i$, i.e.

$$CC_i = C_i / (C_1 + C_2 + C_3) \quad (6)$$

where $C_i$ is the transmittance. If constant color is maintained in a region, then the values of $k_i$ can be adjusted so that the calculated Pseudo-Luma is independent of the $X_i$'s in that region. An additional constraint on the values of $k_i$ provides this:

$$k_1 C_1 = k_2 C_2 = k_3 C_3 \quad (7)$$

When the values of $k_i$ are adjusted to achieve the above dual equality (equation (7)), then the contribution of the unknown signal sensitivity proportion or the $X_i$'s is eliminated in that region of assumed constant color. By substitution of the above equation (7) with equations (1) and (4):

$$k_1 C_{m1} = X_1 k_1 C_1 \quad (8a)$$

$$k_2 C_{m2} = X_2 k_2 C_2 = X_2 k_1 C_1 \quad (8b)$$

$$k_3 C_{m3} = X_3 k_3 C_3 = X_3 k_1 C_1 \quad (8c)$$

Adding the equations (8a–c) yields:

$$k_1 C_{m1} + k_2 C_{m2} + k_3 C_{m3} = (X_1 + X_2 + X_3) k_1 C_1 = K_2 C_2 = K_3 C_3 \quad (9a)$$

or from combining with equation (4):

$$\text{Pseudo-Luma} = 3(k_1 C_{m1} + k_2 C_{m2} + k_3 C_{m3}) \quad (9b)$$

where $X_1 + X_2 + X_3$ = unity. If these values of $k_i$ can be found, then the unknown signals ($C_1$) and Pseudo-Luma can be fully determined from the measured transmittance values $C_{mi}$.

There are various methods for determining these values of $k_i$.

Determining $k_i$—Method A

A first method of calculating the values of $k_i$ is to assume a constant color determined from a low-pass filtered version of the measured transmittance values, $C_{mi}$. This is different from the above cited prior art example where the desired signals, $C_i$, are determined by simple low-pass filtering of the measured transmittance values, $C_{mi}$. Instead, the inverse of the low-pass filtered measured transmittances are used to form the weightings $k_i$ which are then used to form the Pseudo-Luma and ultimately a colored image as will be described later on. The values of $k_i$ are calculated as follows:

$$k_1 = 1pf(C_{m2}) 1pf(C_{m3}) / [1pf(C_{m1}) 1pf(C_{m2}) + 1pf(C_{m1}) 1pf(C_{m3}) + 1pf(C_{m2}) 1pf(C_{m3})] \quad (10a)$$

$$k_2 = 1pf(C_{m1}) 1pf(C_{m3}) / [1pf(C_{m1}) 1pf(C_{m2}) + 1pf(C_{m1}) 1pf(C_{m3}) + 1pf(C_{m2}) 1pf(C_{m3})] \quad (10b)$$

$$k_3 = 1pf(C_{m1}) 1pf(C_{m2}) / [1pf(C_{m1}) 1pf(C_{m2}) + 1pf(C_{m1}) 1pf(C_{m3}) + 1pf(C_{m2}) 1pf(C_{m3})] \quad (10c)$$

where $1pf(C_{mi})$ is a low-pass filtered version of the measured transmittance $C_{mi}$. The Pseudo-Luma's can be calculated by using the values of $k_i$ from equations (10a–c) with equations (9) and (4). This method provides a Pseudo Luma signal with minimal noise contribution from the CFA. Whilst the $1pf(C_{mi})$ values carry low frequency variations from the CFA, the effect of low frequency variations in the $k_i$ values has a much smaller effect than low frequency variations in the $1pf(C_{mi})$ values, owing to the normalizing and averaging properties of equations (10a–c). Furthermore as the $k_i$ values sum to unity, see equation (5), the high frequency content and overall dynamic range of the Pseudo-Luma signal is not degraded.

Determining $k_i$—Method B

An alternative method for calculating the values of $k_i$ is to assume that within a spatial neighborhood the ratios between high-passed measured signals are constant and any deviation from this constancy is owing to the CFA modulation. This assumption is realized by modifying the values of $k_i$ so that the high frequency power in the measured transmittance values, $C_{mi}$ is minimised. Firstly, high-pass signals, $HP_i$, are formed:

$$HP_1=hpf(C_{m1}) \quad (11a)$$

$$HP_2=hpf(C_{m2}) \quad (11b)$$

$$HP_3=hpf(C_{m3}) \quad (11c)$$

by application of an FIR or other digital filtering means.

High spatial frequency power, HFP is defined as:

$$HFP=\Sigma[k_1HP_1+k_2HP_2+k_3HP_3]^{**}2 \quad (12)$$

where $\Sigma$ denotes summing in a weighted neighborhood about the sample for which the values of $k_i$ are being determined. Equation (12) is minimised by taking partial derivatives with respect to the values of $k_i$ and solving the resulting simultaneous equations. By simple inspection of equation (12), if all of the $k_i$ values equal zero, then HFP is minimised. However this would violate equation (5) which requires that the $k_i$ values sum to unity. Using equations (5) and (12) to eliminate $k_3$ yields:

$$HFP=\Sigma[k_1(HP_1-HP_3)+k_2(HP_2-HP_3)+HP_3]^{**}2 \quad (13)$$

Equation (13) is minimised by taking partial derivatives with respect to $k_1$ and $k_2$ and solving the following equation for $k_1$ and $k_2$.

$$\begin{bmatrix} \sum (HP_1-HP_3)^2 & \sum (HP_1-HP_3)(HP_2-HP_3) \\ \sum (HP_1-HP_3)(HP_2-HP_3) & \sum (HP_2-HP_3)^2 \end{bmatrix} \begin{bmatrix} k_1 \\ k_2 \end{bmatrix} = \begin{bmatrix} -\sum (HP_1-HP_3)HP_3 \\ -\sum (HP_2-HP_3)HP_3 \end{bmatrix} \quad (14)$$

$k_3$ is determined with known values of $k_1$ and $k_2$, from equation (14), and from equation (5).

Equations similar to equation (13) can be formed by choosing to eliminate $k_1$ or $k_2$ instead of $k_3$. When applied, slightly different values of $k_i$ are obtained. An extension of this method would be to form and average the 3 sets of $k_i$ values formed when $k_1$, $k_2$, or $k_3$ are eliminated by the constraint of equation (5).

Determining $k_i$—Method C

Yet another method for calculating the values of $k_i$ is to assume that the standard deviations values, $SD_i$, in a neighborhood are made equal by weighting the measured signals by the $k_i$ values subject to the constraint of equation (5):

$$SD_1=sqrt\{(\Sigma[C_{m1}-C_{m1}(av)]^{**}2)/(n-1)\} \quad (15a)$$

$$SD_2=sqrt\{(\Sigma[C_{m2}-C_{m2}(av)]^{**}2)/(n-1)\} \quad (15b)$$

$$SD_3=sqrt\{(\Sigma[C_{m3}-C_{m3}(av)]^{**}2)/(n-1)\} \quad (15c)$$

where n is the number of pixels in the neighborhood used to evaluate the values of $SD_i$. $C_{mi}(av)$ is the average value of $C_{mi}$ in this region. In the most general sense equations (15a–c) could be modified to unequally weight the contribution of the members of the neighborhood to the standard deviation calculation. The values of $k_i$ that equate standard deviation and satisfy equation (5) and equations (15a–c) are:

$$k_1=SD_2SD_3/(SD_1SD_2+SD_1SD_3+SD_1SD_2) \quad (16a)$$

$$k_2=SD_1SD_3/(SD_1SD_2+SD_1SD_3+SD_1SD_2) \quad (16b)$$

$$k_3=SD_1SD_2/(SD_1SD_2+SD_1SD_3+SD_1SD_2) \quad (16c)$$

An extension of this method is to calculate the standard deviations based on spatially filtered versions of the values of $C_{mi}$. For example, high-pass filtering of the $C_{mi}$ (as described in Method B) could be using to form the values of $SD_i$ as follows:

$$SD_1=sqrt\{([HP_1-HP_1(av)]^{**}2)/(n-1)\} \quad (17a)$$

$$SD_2=sqrt\{([HP_2-HP_2(av)]^{**}2)/(n-1)\} \quad (17b)$$

$$SD_3=sqrt\{([HP_3-HP_3(av)]^{**}2)/(n-1)\} \quad (17c)$$

where $HP_i(av)$ is the average value, typically zero, of $HP_i$ in this region.

Those skilled in the art will appreciate that combinations of the above methods represent additional methods. Furthermore, it will be appreciated that the definitions of neighborhoods is broad and includes adaptive, varying and other dynamic neighborhoods. Furthermore it is not required that neighborhoods be the same in any of these combinations, nor does the spatial extent of any of the FIR filters used have to be the same as the spatial extent of a neighborhood.

Having determined the values of $k_i$ by any one of the above described methods or combinations thereof, Pseudo-Luma can now be determined at each sample location by application of equation (9b). The reconstructed Pseudo-Luma signal provides a luminance-like signal, but saturated colors have lower values than would be the case had a true luminance signal (that would result from application of equation (3a)) been calculated.

Method for Estimating Unknown Signals

The pseudo-luma equation and the determined weighting values are then used to determine the unknown signals, see step 5 in FIG. 2. The weighting values input, in step S3a, into step 5 need not be the same weighting values as those used to determine the pseudo-luma equation in step S4, i.e. it is not essential to use the same weighting values to determine the pseudo-luma equation and the color signals.

Simple application of equation (7), that exploits the color constancy in a neighborhood assumption, can be used to determine the estimates of the values of $C_i$.

$$\text{Pseudo-Luma}=k_1C_1+k_2C_2+k_3C_3 \quad (4)$$

$$k_1C_1=k_2C_2=k_3C_3 \quad (7)$$

$$\text{Pseudo-Luma}=3(k_1C_{m1}+k_2C_{m2}+k_3C_{m3}) \quad (9b)$$

$$C_1=[\text{Pseudo-Luma}]/[3k_1]=C_{m1}+k_2C_{m2}/k_1+k_3C_{m3}/k_1 \quad (18a)$$

$$C_2=[\text{Pseudo-Luma}]/[3k_2]=k_1C_{m1}/k_2+C_{m2}+k_3C_{m3}/k_2 \quad (18b)$$

$$C_3=[\text{Pseudo-Luma}]/[3k_3]=k_1C_{m1}/k_3+k_2C_{m2}/k_3+C_{m3} \quad (18c)$$

It will be appreciated by those skilled in the art that the above described methods contains ratios which may be sensitive to noise in signal and/or calculation means. Various known methods, such as low-pass filtering, median filtering, range limiting/thresholding, etc. may be applied to any of the above calculations in order to reduce any impact from noise.

The method described can be used for any system with unknown signals and unknown signal sensitivity as described by equations (1). Whilst equations (2) are written for a three channel system, those skilled in the art will appreciate that the method can be used for any multi-channel system where the sum of unknown signal sensitivities is known at each, equation (1d), and the image is measured with a number of channels that is equal to half the sum of the number of unknown signals plus the number of unknown sensitivities, equations (1a–c).

By applying the multi-channel scanning and image processing taught in this specification, it is possible to remove essentially all of the image quality degradation owing to the CFA structure. The method described is applicable to CFA systems where the effective sampling aperture at the film plane is greater than the feature size of elements of the CFA.

The invention has been described in detail with reference to several preferred embodiments thereof. It will be understood by those skilled in the art that variations and modifications may be effected within the scope of the invention.

What is claimed:

1. A method of forming output signals from a plurality of channel input signals, said input signals being a function of both unknown recorded signal levels and unknown signal sensitivities, the method comprising the steps of;
    sampling and measuring the product of the recorded unknown signals and the unknown signal sensitivities for each sampled channel input signal;
    determining at each sampled location channel weighting values which eliminate the contribution of the unknown signal sensitivities; and
    further processing the plurality of channel input signals using the determined weighting values to form output signals that represent the unknown recorded signal levels.

2. A method as claimed in claim 1 wherein said products for each channel are spatially filtered to produce filtered signals, the weighting values being determined from these filtered signals.

3. A method as claimed in claim 2 wherein said products for each channel are spatially filtered by a low pass filter and the weighting values are determined using normalized reciprocals of the filtered signals, subject to the constraints that the sum of the weighting values is unity.

4. A method as claimed in claim 2 wherein said products for each channel are spatially filleted by a high pass filter and the weighting values are determined from these filtered signals using a least squares method.

5. A method as claimed in claim 2 wherein a standard deviation of the filtered signals is calculated and the weighting values are determined using the normalized reciprocals of the standard deviations, subject to the constraint that the sum of the weighting values is unity.

6. A method as claimed in claim 1 wherein a standard deviation of a local neighborhood is calculated, the weighting values being determined using the normalized reciprocals of the standard deviations, subject to the constraint that the sum of the weighting values is unity.

7. A method as claimed in claim 1 wherein the further processing includes the step of forming a psuedo-luma signal using the equation $$\text{pseudo luma signal} = n\sum_{i=1}^{i=n} k_1 Cmi$$

where n is the number of channels, $k_i$ represents the weighting values and $C_{mi}$ represents the measured product of the recorded signals and the signal sensitivities, and using that equation to determine the unknown signals.

8. A method as claimed in claim 1 further including the step of applying the following equations to determine the output signals:

$$C_1 = C_{m1} + k_2 C_{m2}/k_1 + K_3 C_{m3}/k1$$

$$C_2 = k_1 C_{m1}/k_2 + C_{m2} + k_3 C_{m3}/k2$$

$$C_3 = k_1 C_{m1}/k_3 + k_2 C_{m2}/k_3 + C_{m3}$$

where $k_1$ represents the weighting values and $C_{mi}$ represents the measured product of the recorded signals and the signal sensitivities.

* * * * *

UNITED STATES PATENT AND TRADEMARK OFFICE
CERTIFICATE OF CORRECTION

PATENT NO.   : 6,804,407 B2  
DATED        : October 12, 2004  
INVENTOR(S)  : John A. Weldy It is certified that error appears in the above-identified patent and that said Letters Patent is hereby corrected as shown below:

<u>Column 8,</u>
Line 2, "filleted" should be -- filtered --

Signed and Sealed this

Fourth Day of January, 2005

JON W. DUDAS
*Director of the United States Patent and Trademark Office*